United States Patent Office 3,189,630
Patented June 15, 1965

3,189,630
LANTHANIDE ALKYLATED HYDROXY-
BENZOATES
Edgar J. Smutny, San Francisco, Calif., assignor to Shell Oil Company, New York, N.Y., a corporation of Delaware
No Drawing. Filed Oct. 18, 1962, Ser. No. 231,560
3 Claims. (Cl. 260—429.2)

INTRODUCTION

This invention relates to novel metal salts, and to their use as stabilizers for polymers. More particularly, the invention relates to metal salts of certain hydroxybenzoic acids, and to their use as stabilizers in polymeric olefin resins.

It is known that actinic radiation, particularly in the near ultraviolet region, has a deleterious effect on both the appearance and properties of organic polymers. For example, normally colorless or light-colored polyesters yellow on exposure to sunlight, as do such cellulosics as cellulose acetate. Polystyrene discolors and cracks, with accompanying loss of its desirable physical properties when exposed to actinic light, while vinyl resins, such as vinyl chloride and vinyl acetate spot and degrade. The rate of air oxidation of polyolefins such as polyethylene and polypropylene is materially accelerated by ultraviolet light. Such compounds as the hydroxybenzophenones have been used to stabilize the polymers against deterioration.

While many organic compounds, including benzophenones and their alkylated homologs, are useful as actinic stabilizers in resins, the effect of these stabilizers tends to be transient. In many cases, heating of the stabilized polymer in the course of fabrication or use volatilizes some or all of the stabilizer. Similarly, treatment of the stabilized polymer with solvents such as hydrocarbons leaches the stabilizer out of the resin. In either instance, the resulting polymer is substantially less resistant to actinic degradation.

The present invention is directed to a class of light stabilizers which is substantially less volatile and more resistant to leaching than are the stabilizers of the art. Furthermore, not only are many of the compounds of the instant invention excellent light stabilizers, but some of them are also superior antioxidants.

OBJECTS

It is an object of the present invention to provide novel metal salts of certain alkylated hydroxybenzoic acids, useful as antioxidants of actinic stabilizers in plastics. Another object of the invention is the provision of plastic compositions stabilized with such metal salts. The novel class of rare earth salts of certain 3,5-dialkyl-4-hydroxybenzoic acids is another object of the invention. Other objects will be apparent from the following detailed description of the invention.

SALTS

The metal salts of the invention are those of 3,5-dialkyl-4-hydroxybenzoic acid, wherein each alkyl group has up to 8 carbon atoms and at least one alkyl group is branched on the alpha carbon atom. These salts preferably have the structure

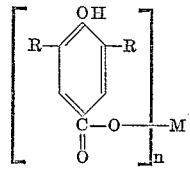

where each R is alkyl of up to 8 carbon atoms, M is an n-valent metal, and $n$ is a positive integer. By metal is meant an electropositive chemical element characterized by its conductivity of heat and electricity at standard conditions of temperature and pressure.

Examples of the alkali metal salts of the 3,5-dialkyl-4-hydroxybenzoic acids include sodium 3,5-di-tert-butyl-4-hydroxybenzoate; potassium 3,5-diisopropyl-4-hydroxybenzoate; and lithium 3,5-di-tert-amyl-4-hydroxybenzoate.

Alkaline earth benzoates include magnesium 3-methyl-5-tert-butyl-4-hydroxybenzoate; calcium 3-ethyl-5-isopropyl-4-hydroxybenzoate; and barium 3,5-di-tert-butyl-4-hydroxybenzoate. Salts of metals of Group IIIA of the Mendeleef Periodic Table are exemplified by aluminum 3,5-di-tert-butyl-4-hydroxybenzoate and yttrium 3,5-di-tert-amyl-4-hydroxybenzoate. Salts of metals from other groups of that table include copper 3,5-di-tert-butyl-4-hydroxybenzoate; manganese 3,5-di-sec-butyl-4-hydroxybenzoate; and zinc 3,5-dicylclohexyl-4-hydroxybenzoate.

Particularly effective as light stabilizers in polyolefins are the paramagnetic salts of 3,5-dialkyl-4-hydroxybenzoic acids. These are the salts of transition metals and of rare earths. Examples of the transition metal salts are iron 3,5-di-tert-hexyl-4-hydroxybenzoate, cobalt 3,5-diisopropyl-4-hydroxybenzoate; and nickel 3-methyl-5-isopropyl-4-hydroxybenzoate.

By rare earth metal salts are meant the salts of metals of the lanthanide series, those metals of atomic number 57 through 71. Such salts includes cerium 3,5-di-tert-butyl-4-hydroxybenzoate; praseodymium 3,5-diisopropyl-4-hydroxybenzoate; neodymium 3-isopropyl-5-tert-butyl-4-hydroxybenzoate; samarium 3,5-di-sec-butyl-4-hydroxybenzoate; europium 3,5-di-sec-hexyl-4-hydroxybenzoate, gadolinium 3,5-di-tert-amyl-4-hydroxybenzoate; dysprosium 3,5-di-tert-butyl-4-hydroxybenzoate; erbium 3,5-diisopropyl-4-hydroxybenzoate; and lutetium 3-isopropyl-5-tert-amyl-4-hydroxybenzoate.

These salts, in their pure form, are white or light-colored crystalline solids. They are readily compatible with solid resinous plastics, and may be incorporated therein by milling or other conventional methods.

PREPARATION

The metal salts of the particular 3,5-dialkyl-4-hydroxybenzoic acids of the invention are prepared by reaction of 3,5-dialkyl-4-hydroxybenzoic acid and a basic metal compound.

The 3,5-dialkyl-4-hydroxybenzoic acid from which the salt is prepared preferably has the structure

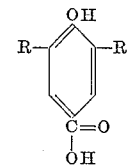

wherein each R is alkyl of up to 8 carbon atoms and at least one alkyl group is branched on the alpha carbon atom, that is, a secondary or tertiary alkyl radical. If desired, the dialkyl-hydroxybenzoic acid may have one or both of the remaining ring positions alkylated, preferably with methyl groups.

Examples of such acids are 3-methyl-5-diisopropyl-4-hydroxybenzoic acid; 3,5 - diisopropyl - 4 - hydroxybenzoic acid; 3 - isopropyl - 5 - tert - butyl - 4 - hydroxybenzoic acid; 3,5 - di - cyclohexyl - 4 - hydroxybenzoic acid; 3,5 - di - sec - butyl - 4 - hydroxybenzoic acid; and 2,4 - dimethyl - 3,5 - di - tert - butyl - 4 - hydroxybenzoic acid.

Particularly preferred acids are those in which each of the alkyl groups ortho to the alkyl groups is tertiary, since these acids are those wherein the phenolic hydroxyl group is the most shielded from reaction. Examples of such acids are 3,5-di-tert-butyl-4-hydroxybenzoic acid; 3,5-di-tert-amyl-4-hydroxybenzoic acid; and 3,5-di-tert-octyl-4-hydroxybenzoic acid.

To form the salt of the invention, the acid described is reacted with a basic metal compound. By basic metal compound is meant a compound which, in aqueous solution, would give the resulting solution a pH greater than 7. Since compounds include the hydroxides of metals, such as sodium hydroxide and potassium hydroxide; or the salts of such metals with weak acids, such as calcium carbonate or magnesium carbonate; or cerium acetate, europium acetate, dysprosium acetate,, sodium acetate, or the like.

The reaction is conducted in liquid phase by conventional methods. For example, the alkali metal salt of the acid is readily prepared by dissolving solid 3,5-dialkyl-4-hydroxybenzoic acid in aqueous base and recovering the resulting salt. Alternatively, the acid may be refluxed in an inert organic solvent with the appropriate metal acetate while azeotroping off the acetic acid-solvent azeotrope. A stoichiometric excess of either the acid or the basic compound may be employed, but, since the reaction is substantially quantitative, only a slight excess of either reactant is required. The preparation of the salt may be conducted at any convenient temperature, temperatures between about 0° C. and about 150° C. being preferred.

The resulting salts may readily be recovered by separating the solvent and reactants from the product by distillation, extraction, crystallization or the like. Since the salts are definite crystalline metal compounds, they may be recovered and purified by these methods or by their combination. For example, when 3,5-diisopropyl-4-hydroxybenzoic acid is dissolved in 10% aqueous potassium carbonate, the resulting potassium 3,5-diisopropyl-4-hydroxybenzoate is recovered by cooling the reaction mixture until the metal salt crystallizes, and recovering the resulting needle-like crystals. The product may, in turn, be washed or recrystallized with water or other appropriate solvents.

COMPOSITIONS

It is a surprising and advantageous feature of the invention that the metal salts described act as stabilizers for polyolefins. In general, it has been observed that traces of metals and of metal salts in such polyolefins as polyethylene and polypropylene act as pro-oxidants, and considerable effort is employed to separate such materials from the resin. However, it has been found that the metal salts of the 3,5-dialkyl-4-hydroxybenzoic acids described act as stabilizers for polyolefins, enhancing their stability to thermal and ultraviolet degradation.

The salts of the invention are generally useful as actinic stabilizers in all solid synthetic organic plastics normally subject to actinic degradation. Exemplary of such plastics are the polyvinyl resins, such as polyvinyl chloride, polyvinyl acetate, polyvinyl butyral, polystyrene, and the acrylates and methacrylates, such as polymethyl methacrylate.

The preferred class of plastics in the compositions of the invention, however, are the polyolefins. The polymers of alpha-olefins stabilized by the compounds of the invention are those normally solid hydrocarbon polymeric materials which are obtained by polymerizing such monoolefins as ethylene; propylene; butene-1; pentene-1; 3-methyl-butene-1; hexene-1; 4-methyl-pentene-1; 4-methyl-hexene-1; 4,4-dimethyl-pentene-1; and the like, as well as their copolymers, e.g., ethylene-propylene copolymers and the like. Polymers of olefins having up to 8 carbon atoms are the preferred species.

Particularly preferred polymers for the compositions of this invention are those normally solid polymers of alpha-olefins having up to three carbon atoms, e.g., ethylene and propylene, and their copolymers.

The stabilized polymeric compositions of the invention are those comprising a major amount of a resin such as those described above in intimate admixture with a metal salt of 3,5-dialkyl-4-hydroxybenzoic acid. The salt is readily incorporated in the resin to afford a stable homogeneous composition. For example, mechanical methods such as Banburying or hot milling, may be employed to combine the stabilizer with the solid resin. Where the polymer is prepared from a liquid monomer, as in the case of styrene or methyl methacrylate, the stabilizer may be dispersed or dissolved in the monomer prior to polymerization or curing.

Only sufficient stabilizer is required to stabilize the polymer against actinic degradation. Depending on the nature of the polymer, the particular stabilizer employed, and the severity of exposure of the resulting composition, from about 0.001% to 10% by weight of the stabilizer, based on the polymer, will be required. In most cases, however, from about 0.1% to about 1% on the same basis will be sufficient.

In addition to the actinic stabilizers described, the plastic compositions may contain other additives such as plasticizers, pigments, fillers, dyes, glass or other fibers, thermal antioxidants, and the like. For example, in most applications, it will be desirable to incorporate into the resin compositions sufficient thermal antioxidant to protect the plastic against thermal and oxidative degradation. The amount of antioxidant required will be comparable to that of the actinic stabilizer, i.e., from about 0.001% to about 10% by weight, based on the polymer. Representative of such antioxidants are amino compounds such as diisopropanolamine; p-phenylene diamine and durene diamine; phosphite esters, such as triphenyl phosphite and dibutyl phosphite and alkyl aryl phosphites such as dibutyl phenyl phosphite, and the like.

The best results are obtained with the preferred class of thermal antioxidants, the hindered phenols. These compounds have been found to provide the best thermal stabilization with the least attendant discoloration in the compositions of the invention. These phenols may be mononuclear, as in the case of 2,6-di-tert-butylphenol; 2,6-di-tert-butyl - 4 - methylphenol; 2,6-diisopropyl-4-methoxymethylphenol; 2,6 - di-tert-butyl-4-hydroxymethylphenol; and 2,4-dimethyl-6-tert-butylphenol; or they may be polynuclear. Particularly preferred polynuclear phenols are the biphenols, such as 3,3',5,5'-tetra-tert-butyl-biphenol and 3,3',5,5'-tetraisopropyl-biphenol; and such bisphenols as bis(3,5-di-tert-butyl-4-hydroxyphenyl)methane; bis(3-tert-butyl-5-methyl-2-hydroxyphenyl)methane; and bis(3-tert - butyl - 5-methyl-2-hydroxyphenyl) sulfide. Other polynuclear phenolic compounds which are effective antioxidants include the bis(3-dialkyl-4-hydroxybenzyl) durenes, such as bis(3,5-di-tert-butyl-4-hydroxybenzyl)durene; the polyphenolic phenols, such as 2,4,6-tris(3,5-di-tert-amyl - 4 - hydroxybenzyl)phenol; such polyphenolic benzenes as 1,3,5-trimethyl-2,4,6-tris(3,5-di-tert-butyl-4-hydroxybenzyl)benzene; and the di(3,5-dialkyl-4-hydroxybenzyl) polynuclear aromatics, such as 9,10-bis(3,5-di-tert-butyl-4-hydroxybenzyl) anthracene and 1,4-bis(3,5-diisopropyl-4-hydroxybenzyl)naphthalene.

Plastic compositions consisting essentially of a solid organic polymeric material of the type described and containing stabilizing amounts of the metal 3,5-dialkyl-4-hydroxybenzoate actinic stabilizer and of the phenolic antioxidants described are characterized by extreme physical and chemical durability at elevated temperatures and extended exposures to ultraviolet radiation. Furthermore, light colored or transparent resinous products of these compositions do not change color under even the most severe conditions of use.

The following examples will illustrate the nature and advantages of the compositions of the invention. It should be understood, however, that the examples are merely illustrative, and are not to be regarded as limitations to the appended claims, since the basic teachings thereof may be varied at will, as will be understood by one skilled in the art.

*Example I*

Sodium 3,5-di-tert-butyl-4-hydroxybenzoate was prepared by dissolving 3,5-di-tert-butyl-4-hydroxybenzoic acid in a 10% w. aqueous solution of sodium carbonate. The resulting reaction mixture was extracted with carbon tetrachloride to remove insoluble components, and the yellow-green aqueous solution cooled until the pale yellow needle-like crystals of sodium 3,5-di-tert-butyl-4-hydroxybenzoate precipitated. The needles were recrystallized from water.

*Example II*

5 grams of 3,5-di-tert-butyl-4-hydroxybenzoic acid were dissolved in 100 cc. of water containing 1.1 grams of copper carbonate, the mixture being maintained under nitrogen and held at about 90° C. for 168 hours. At the end of that time sodium carbonate was added to neutralize the excess acid and the mixture cooled. The copper benzoate was precipitated, washed and dried to afford 4.5 grams of copper 3,5-di-tert-butyl-4-hydroxybenzoate.

*Example III*

With 10 grams of 3,5-di-tert-butyl-4-hydroxybenzoic acid was reacted from 4 to 5 grams of each of the following metal acetates. Each reaction was conducted in about 200 cc. of xylene under nitrogen; the reaction mixture was held at a temperature such that the xylene-acetic acid azeotrope was continuously removed. At the end of the reaction, when acetic acid ceased to come over, the solvent was flashed off under reduced pressure and the metal 3,5-di-tert-butyl-4-hydroxybenzoate recovered. The experimental data are summarized below:

| Acetate | Wt., g. | 3,5-Di-tert-butyl-4-hydroxy-Benzoate Salt | Wt., g. |
|---|---|---|---|
| Ce(Ac)$_4$ | 3.9 | Ce | 9.0 |
| La(Ac)$_3$ | 4.35 | La | 12.5 |
| Sm(Ac)$_3$ | 4.54 | Sm | 12.1 |
| Gd(Ac)$_3$ | 4.65 | Gd | 12.4 |
| Er(Ac)$_3$ | 4.75 | Er | 12.3 |
| Dy(Ac)$_3$ | 4.67 | Dy | 12.4 |
| Nd(Ac)$_3$ | 4.42 | Nd | 12.7 |
| Didymium(Ac)$_3$* | 4.40 | Didymium | 12.2 |
| Y(Ac)$_3$ | 3.70 | Y | 12.5 |
| Al(OH)(Ac)$_2$ | 3.36 | Al(OH) | 11.5 |

*Didymium is a mixture of neodymium and praseodymium.

The metal benzoates were purified, and their identity established by infrared spectroscopy.

*Example IV*

The metal salts described in the previous examples were evaluated as thermal antioxidants in polypropylene. In the heat aging test, polypropylene film samples five mils in thickness were maintained in an oven at 133° C. Each sample was tested for loss of elongation twice each day until the film tore easily. The number of hours shown in the table are the total elapsed hours before the film tested lost its tensile strength and flexibility. It will be seen from the table that the candidate compounds increased the heat stability of the polypropylene materially.

All samples tested contained 0.2% w. of bis(3,5-di-tert-butyl-4-hydroxybenzyl) durene in addition to the benzoate salt.

TABLE I

| Salt (0.5% w.): | Hours to Failure, 133° C. |
|---|---|
| None | 290 |
| Sodium 3,5-di-tert-butyl-4-hydroxybenzoate | 350 |
| Nickel 3,5-di-tert-butyl-4-hydroxybenzoate | 480 |
| Basic aluminum 3,5-di-tert-butyl-4-hydroxybenzoate | 300 |

*Example V*

In the outdoor exposure test, five mil film samples of the same polypropylene as in the previous example were exposed on the laboratory at Emeryville, California, and to Arizona sun, and periodically tested by bending through 180°. The number of weeks required before the films so tested snapped on bending is shown in the table. It will be seen that the sodium salt compound increased the weather stability of the polypropylene materially.

TABLE II

| Additive (0.5% w.) | Emeryville Roof, Weeks | Arizona, Weeks |
|---|---|---|
| None | 3.5 | 8.5 |
| Sodium 3,5-di-tert-butyl-4-hydroxybenzoate | 9.5 | 15.5 |

*Example VI*

In the accelerated Fade-Ometer test, the conventional Atlas Weatherometer wherein the arc light source has been supplemented by addition of eight fluorescent ultraviolet light sources, all film samples tested pass within a quarter inch of the light sources. It has been found that in this accelerated exposure test, conditions are approximately eight times as stringent as in the unmodified Weatherometer. It will be seen from the table that under these extreme conditions use of the salts of the invention more than doubles the ultraviolet light stability of the polypropylene.

The resulting data were obtained using polypropylene samples containing in addition to the metal salt evaluated, 0.2% w. of bis(3,5-di-tert-butyl-4-hydroxybenzyl)durene as thermal antioxidant.

| Salt: | Fade-Ometer, days |
|---|---|
| None | 4½ |
| Sodium 3,5-di-tert-butyl-4-hydroxybenzoate | 12½ |
| Manganese 3,5-di-tert-butyl-4-hydroxybenzoate | 12½ |
| Nickel 3,5-di-tert-butyl-4-hydroxybenzoate | 14 |
| Copper 3,5-di-tert-butyl-4-hydroxybenzoate | 10½ |
| Cobalt 3,5-di-tert-butyl-4-hydrozybenzoate | 24 |
| Yttrium 3,5-di-tert-butyl-4-hydroxybenzoate | 10 |
| Lanthanum 3,(5-di-tert-butyl-4-hydrozybenzoate | 10 |
| Cerium 3,5-di-tert-butyl-4-hydroxybenzoate | 9½ |
| Neodymium 3,5-di-tert-butyl-4-hydroxybenzoate | 14½ |
| Samarium 3,5-di-tert-butyl-4-hydroxybenzoate | 14 |
| Gadolinium 3,5-di-tert-butyl-4-hydroxybenzoate | 10½ |
| Dysprosium 3,5-di-tert-butyl-4-hydroxybenzoate | 14 |
| Erbium 3,5-di-tert-butyl-4-hydroxybenzoate | 9½ |
| Didymium [1] 3,5-di-tert-butyl-4-hydroxybenzoate | 14 |
| Basic aluminum 3,5-di-tert-butyl-4-hydroxybenzoate | 8½ |

[1] Didymium is a mixture of neodymium and praseodymium.

I claim as my invention:
1. Dysprosium 3,5-di-tert-butyl-4-hydroxybenzoate.
2. Samarium 3,5-di-tert-butyl-4-hydroxybenzoate.
3. Neodymium 3,5-di-tert-butyl-4-hydroxybenoate.

(References on following page)

References Cited by the Examiner

UNITED STATES PATENTS

| | | | |
|---|---|---|---|
| 1,933,520 | 10/33 | Bruson | 260—439 |
| 2,252,664 | 8/41 | Reiff et al. | 260—429 |
| 2,395,307 | 2/46 | Weber et al. | 260—414 |
| 2,598,496 | 5/52 | Bradley et al. | 260—45.75 |
| 2,903,346 | 12/57 | Coffeld | 260—439 |
| 2,935,491 | 5/60 | Mack | 260—45.75 |
| 2,997,454 | 8/61 | Leistner et al. | 260—45.75 |
| 3,029,276 | 4/62 | Hausweiler et al. | 260—473 |
| 3,112,338 | 11/63 | Smutny et al. | 260—473 |

CARL D. QUARFORTH, *Primary Examiner.*

REUBEN EPSTEIN, BENJAMIN R. PADGETT, LEON J. BERCOVITZ, *Examiners.*